UNITED STATES PATENT OFFICE.

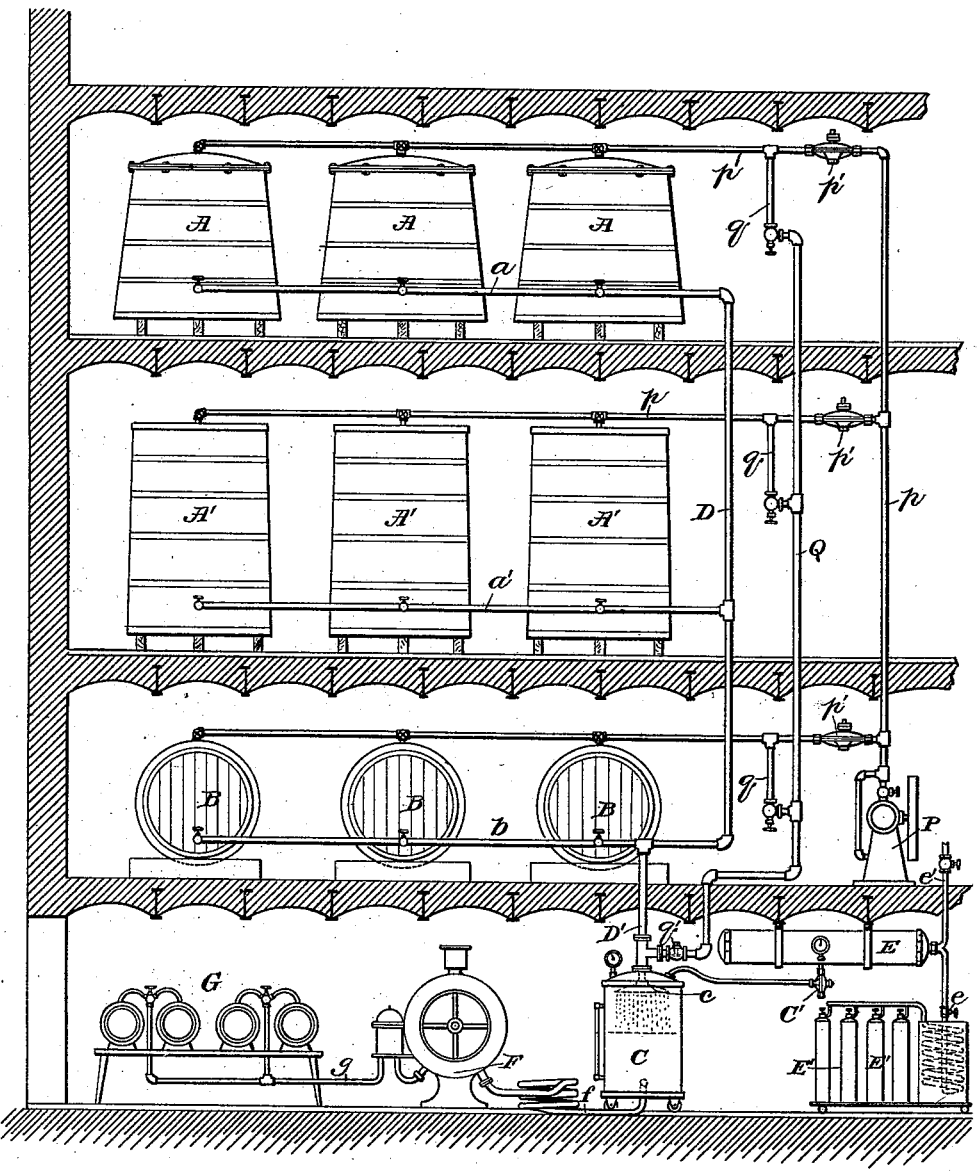

JACOB F. WITTEMANN, OF FORT HAMILTON, NEW YORK.

METHOD OF FINISHING BEER.

SPECIFICATION forming part of Letters Patent No. 554,851, dated February 18, 1896.

Application filed February 9, 1892. Serial No. 420,886. (No specimens.)

*To all whom it may concern:*

Be it known that I, JACOB F. WITTEMANN, of Fort Hamilton, in the county of Kings and State of New York, have invented certain new and useful Improvements in Methods of Finishing Beer; and I do hereby declare the following to be a full, clear, and exact description of the invention, such as will enable others skilled in the art to which it appertains to make and use the same.

This invention relates to methods of finishing beer which is flat and in a condition of rest or in the condition in which it is usually stored, and the main object is to provide a continuous process of charging the beer with carbonic-acid gas and simultaneously racking it into shipping-packages.

Various methods have heretofore been employed to enable brewers to convert beer which may be on storage and in a flat condition into a marketable effervescing state, such as is now accomplished by the well-known "kraeusing" or "bunging" process, without, however, subjecting the beer to various objectionable changes which result from such processes and which are too well known to require further explanation. The methods employed to supersede these processes aimed at the supersaturation of the beer with carbonic acid other than that generated by refermentation. Various means and methods have been employed to that end, such as are in use for the saturation of other beverages, but owing to the necessarily large bulk of beer to be treated and to its liability to foam under agitation, as well as under the slightest variation of pressure, such ordinary means have proven impracticable. Injection of carbonic-acid gas into beer while contained in storage-casks or while it is being racked from one cask into another, the maintaining of pressure of carbonic-acid gas on beer within casks so as to effect a gradual absorption thereof, and other similar processes have been attempted; but all are more or less defective on account of too great cost, a waste of carbonic acid, labor, room, &c., or because the absorption of carbonic-acid gas by the beer is incomplete or uneven, causing disturbances in filtering and racking and consequent loss.

It is essential in finishing beer to have it entirely saturated with carbonic-acid gas under suitable pressure above the atmospheric pressure and to bring it thus saturated in a practically quiet state and under a practically uniform pressure to the racking-outlets, so as to prevent "sputtering" and the consequent loss of some of the gas contained in the beer and the loss of some of the beer by foaming. Such loss of gas and of a portion of the beer itself has heretofore accompanied the usual methods of finishing and racking beer and all previous methods of mechanical saturation with carbonic-acid gas.

Occasions for having a certain quantity of beer saturated with carbonic-acid gas ($CO_2$) under more than the usual pressure may suddenly present themselves, such as requests from consumers of beer for more than the usual effervescence or the necessity to allow for a partial loss of pressure in the beer which may be occasioned by transportation or storage of the beer under conditions which cause a partial loss of gas through the more or less porous transportation-packages. In all such cases recourse to the methods heretofore used for the mechanical saturation of beer do not answer the requirements of economy in time, labor, material and room, which are necessarily enforced by competition in the brewery business.

The objects of my invention, therefore, are to provide a process of and means for finishing beer ready for the market by effecting as thorough a saturation with pure carbonic-acid gas ($CO_2$) at any desired pressure as can be accomplished by an actual refermentation of the beer, for effecting such saturation virtually without other labor than that of racking and in the act of racking, and for regulating the pressure of and on the beer at the delivery or racking point to a uniform standard.

The invention comprises an improved method of finishing or preparing beer for the market, consisting essentially in causing the liquid to flow continuously under a substantially constant pressure from a fermenting or storage vessel into shipping or delivery packages, the liquid in its passage from such vessel to such packages being caused to flow through an interposed carbonating apparatus wherein the liquid is saturated with carbonic-acid gas, whereby the liquid is taken from a state of rest, charged with carbonic-acid gas and racked off ready for the market all in one continuous operation.

My process begins after the beer has gone through its period of ruh or rest in its cold stage, or in case of quick beer as it comes direct from the fermenting-tuns, having there attained the desired degree of attenuation.

In carrying out the process the beer may be put under an air or gas pressure of from one-half to two atmospheres, as the elevation or friction to be overcome in the racking process requires, and is caused to pass through a suitable carbonating apparatus supplied with carbonic-acid gas, and then to the racking-off table to fill the shipping or distributing packages in a continuous operation. The gas is supplied under a continuous and properly-regulated pressure, so as to prevent the carrying along with the saturated beer of more gas than can be absorbed by the same before it reaches the final racking-outlets at the filling-off tables or before it reaches a filter, which may be used if the precipitation of the solids in the beer is not perfect or if the sediment shows a tendency to rise while the last of each storage-vessel is racked off. The pressure of the beer is also regulated so as to overcome the variations of pressure at the point where it is carbonated, (such variations being caused by the decreasing liquid column in the vessel or vessels out of which it is drawn,) and so as to make such beer-pressure correspond with that at which the supply of carbonic-acid gas ($CO_2$) is regulated or at any suitable lower pressure.

I have illustrated in the accompanying drawing one form of apparatus which may be used in carrying out my invention; but I make no claim herein to such apparatus, as the same forms no part of my present invention.

Apparatus of various kinds may be employed, and hence I do not desire to be limited to any particular form or to any specific arrangement of devices in carrying the invention into effect.

A A A in the drawing represent fermenting-tuns of ordinary construction, which may be provided with removable covers, preferably flanged so as to adapt them to be bolted to a flanged rim so as to provide an air-tight joint in case the tuns are not placed at a sufficient elevation above the delivery or racking point to create the necessary hydrostatic pressure for the process.

A' A' A' may represent ordinary wooden storage-tuns provided with strengthened heads and bottoms; but metal tuns with air-tight parts are preferable.

B B B represent ordinary storage-vessels or bunging-casks arranged on a floor below the storage-tuns.

The several fermenting tuns and casks in each row or tier are connected near the bottom thereof by means of suitable racking cocks and pipes $a\ a'\ b$, respectively, to a common delivery-pipe D. The pipe D and through it the several tuns and casks, or either of them, are or is connected directly with a carbonating apparatus C by means of a pipe-section D' for the purpose of obtaining a continuous head or pressure of beer or for the purpose of blending the beer from different casks. Two or more may be treated or racked off together or in rotation. If desired, however, instead of pipes, hose connections and suitable fittings, such as are commonly employed in breweries for a similar purpose, may be used. The beer from the tuns and casks passes through the pipes or hose D D' into the carbonating or supersaturating apparatus C. This carbonating apparatus may be of any suitable and well-known construction—such, for instance, as shown in my Patent No. 487,342, dated December 6, 1892—for effecting the saturation of the liquid with carbonic-acid gas while the desired or necessary pressure is maintained.

The necessary supply of carbonic-acid gas from a reservoir E may enter the carbonating apparatus through a pressure-regulator C', or it may be supplied by a self-regulating compressor (not shown) similar to the air-compressors customarily used in lager-beer breweries, drawing the carbonic acid from any suitable reservoir, which in turn may be supplied by generators or from fermenting-tuns.

The carbonic acid is preferably stored in a reservoir E, which may be provided with a pressure-gage, an air-exhaust and a gas-inlet.

E' E' may represent a battery of cylinders containing compressed carbonic acid, which may be employed to furnish the necessary supply of gas through a preferably self-regulating valve $e$. A similarly-valved branch pipe $e'$ may lead to an alternate carbonic-acid-gas supply under pressure, or connect with a compressor, if desired. The beer, after it has been precipitated through the gas-chamber which is maintained in the upper part of the carbonating apparatus C, is discharged from the bottom of said apparatus, preferably through a long pipe or hose $f$ having a suitable coil therein, (if desired,) into a filter F. This filter may be arranged to have the beer pass through the same before reaching the carbonating apparatus instead of after the same, as shown, and may be of any improved form. From the filter F the beer is conducted through a pipe or hose $g$ directly to the racking-off cock or cocks on the racking-table G and allowed to fill the shipping or distributing packages, either under atmospheric pressure or under a counter-pressure of gas taken from the storage-tank E or an independent tank of similar construction in which is maintained a regular pressure slightly less than that at which the finished beer is delivered at the racking-table. Where a cask or series of casks or other suitable storage-vessels are to be drained entirely, or provided a filter be not relied upon for the elimination of some of the sediment which is liable to be racked off along with the clear beer, it is desirable to provide a racking or drawing off connection which opens into the said cask or casks or other storage-vessels at or near their bottom, by which means the sediment is first blown off directly or conveyed into a proper receptacle before the beer passes to the carbonating apparatus. If a filter is not relied upon, a racking connection may be made direct with the carbonating apparatus to the distributing-table.

A pump or forcing apparatus P may be provided for maintaining the desired pressure in the several tuns and casks, and is connected by means of suitable pipes $p$ $p$ $p$ with the tops of the several rows or tiers of tuns or casks, each pipe $p$ being preferably provided with a pressure regulator or governor $p'$, which is interposed between the aforesaid forcing apparatus and the casks or tuns for regulating the air or gas supply that serves in said vessels the successive purposes of bunging or precipitating the solids by pressure and for racking off the beer under pressure through the carbonating apparatus, and also through the filter when the latter is employed, on to the final racking-off or distributing table into the delivery-packages. The object of these governors is to keep up a uniform pressure on the beer during its passage through the carbonating apparatus to the racking-table, no matter what the added weight of the column of beer may be ahead of the same; and by the use of a governor at each cask or tier of casks or tuns a reserve of air or gas may be compressed to the highest pressure necessary, or an excess of pressure may be maintained at the source of pressure, while the pressure in each cask is fixed or unvarying. In this connection I may also provide an equalizing-pipe Q connected by means of suitable branch-pipes $q$ $q$ with the pipes $p$, said pipes $q$ $q$ being each provided with a stopcock or valve. The lower end of the pipe Q is connected by means of a suitable pipe-coupling with the pipe or hose D' which leads into the carbonating apparatus C and is provided with a check-valve $q'$. By these means a uniform pressure on the beer is maintained during its passage through the carbonating apparatus and on to the racking-table irrespective of the varying weight of the beer that may be added to said pressure as the storage-vessels are more or less full or emptied of their contents and irrespective of the location or elevation of said vessels above or below the level of the carbonating apparatus through which the beer is forced, in which case, if the pressure is not uniform, the result is that the pressure at the racking-off table greatly varies, and with it the speed of racking, the degree of saturation, and the consequent loss by foaming and time; and any excess of pressure at the point of discharge into the carbonating apparatus is relieved by the escape of the confined liquid air or gas through the check-valve $q'$ and equalizing apparatus Q $q$, the escaping liquid or gas exerting a back-pressure upon the diaphragms of the pressure-regulators. This equalizing apparatus may, however, be dispensed with, and is not necessarily a part of my improved method of finishing beer, but is of advantage for the reasons hereinbefore stated.

The apparatus for forcing air or gas into the tuns or casks above the carbonating apparatus may be dispensed with when the fermenting-tuns or other vessels are sufficiently elevated to secure the necessary supply under hydrostatic pressure only.

It is obvious that the method herein employed is adapted to the preparation of other beverages for the market than beer, and that the invention is not confined to this one article.

Having thus fully described my invention, what I claim as new, and desire to secure by Letters Patent of the United States, is—

1. The method of finishing and preparing beer for the market, which consists in causing the liquid to flow from its containing-vessel under a substantially constant pressure into a carbonating-chamber, mechanically saturating the moving liquid under suitable pressure above the atmospheric pressure with carbonic-acid gas, and racking it off directly into delivery or shipping packages ready for the market while said pressure is maintained, all in one continuous operation, substantially as described.

2. The continuous process of treating and finishing beer, which consists in subjecting it to a constant pressure in suitable storage-vessels, forcing it therefrom into and through a carbonating apparatus, maintaining in said apparatus a uniform pressure of carbonic-acid gas, and racking off the beer into suitable delivery or shipping packages in a continuous operation, meanwhile equalizing the pressure maintained in the storage-vessels so as to insure a uniform discharge of the beer into the carbonating apparatus and from thence into the shipping-packages, substantially as described.

3. The continuous process of finishing beer, which consists in forcing it from storage-casks into a carbonating apparatus under a substantially constant air or gas pressure higher than that of the carbonic-acid-gas pressure maintained within the carbonator, and controlling said constant pressure by causing any excess of pressure at or near the point of delivery into said carbonator to react on the air and gas supply, substantially as described.

4. The continuous process of finishing beer for the market, which consists of subjecting it in suitable storage-vessels to external pressure of air or gas, forcing it therefrom under said pressure into and through a carbonating apparatus while a suitable supply of carbonic-acid gas is maintained therein under a pressure higher than that of the atmosphere and lower than that under which the beer enters the carbonator, racking off the carbonated beer into delivery or shipping packages, meanwhile controlling and maintaining the pressure in the storage-vessels, so as to insure an even flow and saturation with carbonic acid and a uniform discharge of the beer, all in a continuous operation, substantially as described.

5. The hereinbefore-described method of finishing or preparing beer for the market, which consists in racking the same from a fermenting or storage vessel into a carbonator under a substantially constant pressure, causing the beer to flow against a gas-pressure less than said constant pressure of the liquid, saturating the moving liquid with carbonic-acid gas in its passage and racking it off into shipping-casks in one continuous operation, substantially as described.

6. The continuous method of finishing or preparing beer for the market which consists in causing the liquid to flow continuously under a substantially constant pressure from a fermenting or storage vessel into shipping or delivery packages; the liquid in its passage being caused to flow through an interposed carbonating apparatus wherein the moving liquid is saturated with carbonic-acid gas, whereby the liquid is taken from a state of rest, charged with carbonic-acid gas and racked off ready for the market in a continuous operation, substantially as described.

In testimony whereof I have signed this specification in the presence of two subscribing witnesses.

JACOB F. WITTEMANN.

Witnesses:
W. H. RUFF,
S. S. STOUT.